United States Patent [19]
Glotin

[11] Patent Number: 5,947,172
[45] Date of Patent: Sep. 7, 1999

[54] INFLATOR DEVICE USING A COMPRESSED GAS CYLINDER OR CARTRIDGE

[75] Inventor: Joel Glotin, Yerres, France

[73] Assignee: Zefal, Aubervilliers, France

[21] Appl. No.: 09/055,930

[22] Filed: Apr. 7, 1998

[30] Foreign Application Priority Data

Apr. 7, 1997 [FR] France .................................. 97-04215

[51] Int. Cl.⁶ ...................................................... B65B 1/04
[52] U.S. Cl. .............................. 141/383; 141/19; 141/38; 222/5; 222/81; 152/415
[58] Field of Search ................................ 141/38, 19, 383, 141/329, 330; 222/5, 81; 152/415

[56] References Cited

FOREIGN PATENT DOCUMENTS

| 2 653 523 | 4/1991 | France . |
| 32 05 264 | 8/1983 | Germany . |
| 37 11 583 | 10/1987 | Germany . |
| 41 20 188 | 9/1992 | Germany . |
| 43 24 220 | 1/1995 | Germany . |

*Primary Examiner*—Steven O. Douglas
*Attorney, Agent, or Firm*—Young & Thompson

[57] ABSTRACT

An inflator device uses a compressed gas cylinder or cartridge for inflating a tire or the like having an inflator valve. It has an internally screwthreaded supply bore adapted to have screwed into it the neck of the cylinder or the cartridge closed by a capsule and at the bottom of which is provided a perforator surrounded by a supply seal. The supply bore communicates via an axial hole with a distribution bore, the communication being controlled by a selectively operated valve carried by a distributor moveable axially. The device further includes a cavity adapted to receive in sealed fashion the inflator valve of the tire or the like and communicating with the distribution bore. The seal is assured by a valve seal which has two coaxial circular parts joined by a transverse annular part. The valve seal is placed in the cavity with the annular part facing outwards and held in the cavity by a cap provided with a passage for the valve of the tire or the like. A passage is provided for establishing communication between the distribution bore and the space between the two coaxial circular parts of the valve seal.

23 Claims, 3 Drawing Sheets

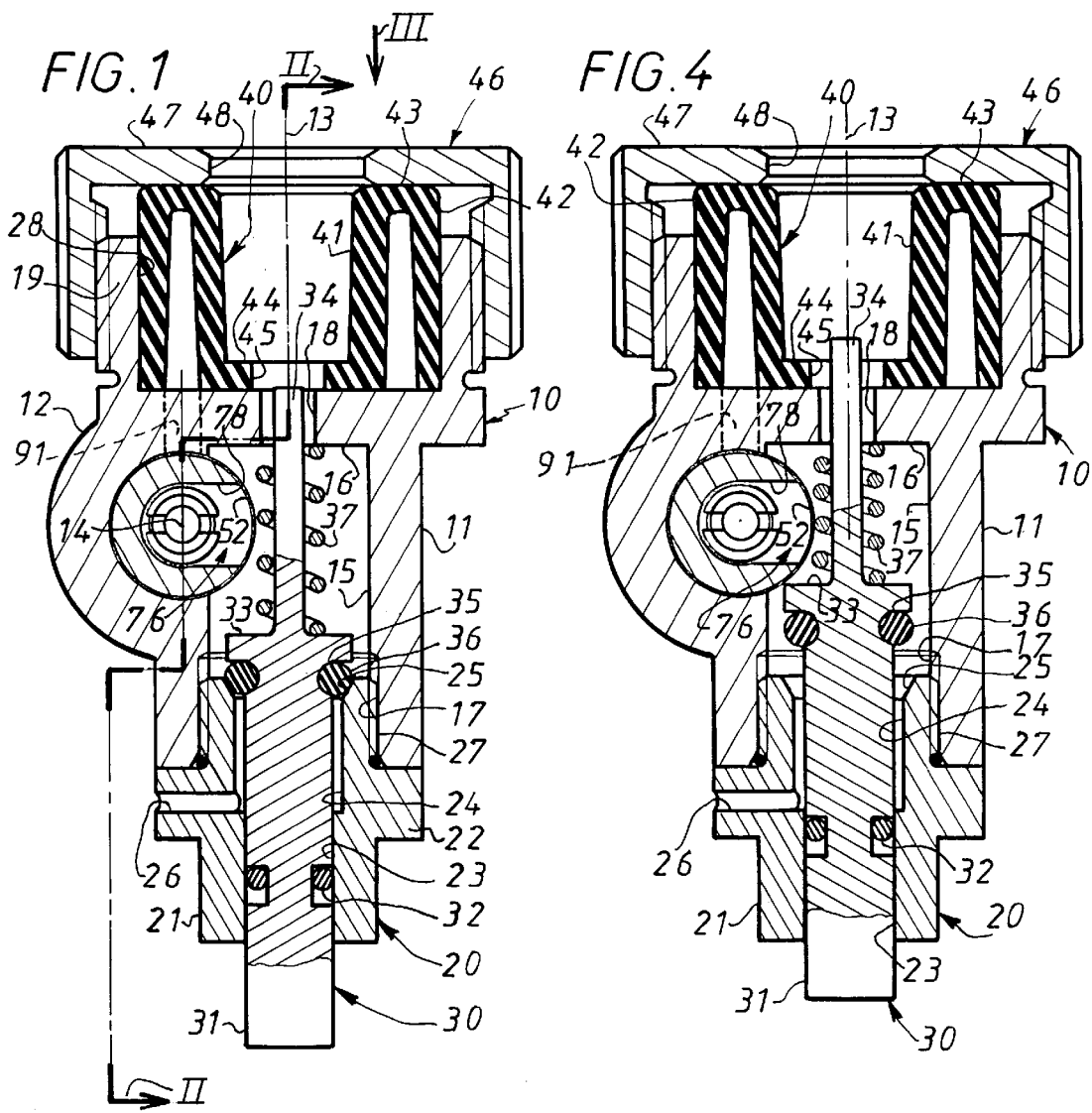
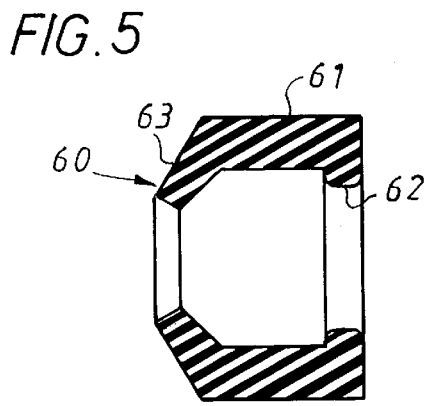
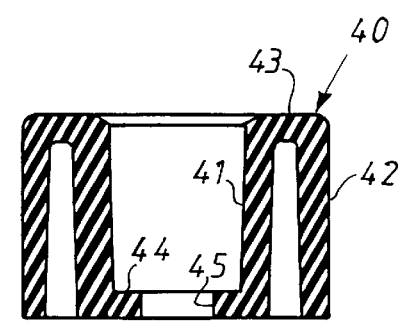

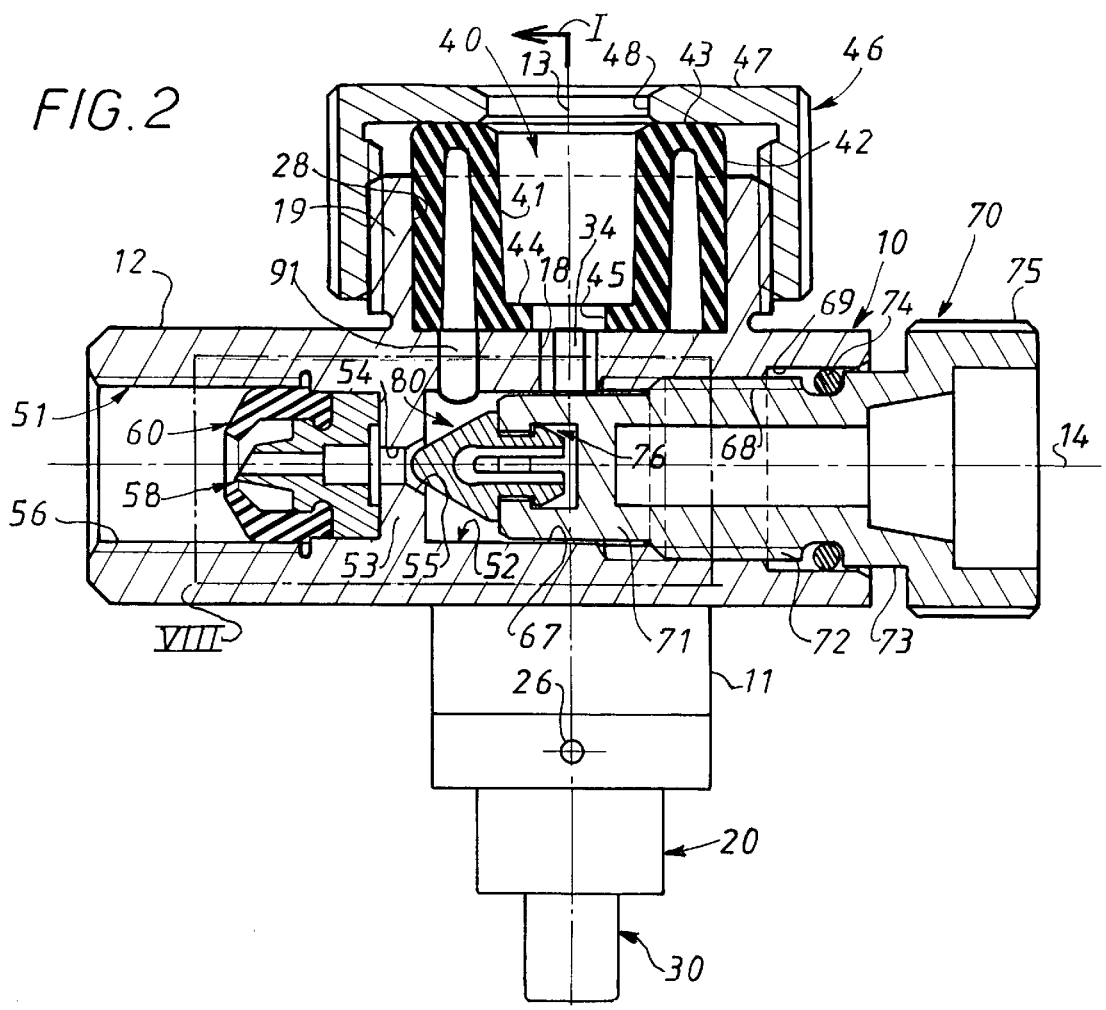
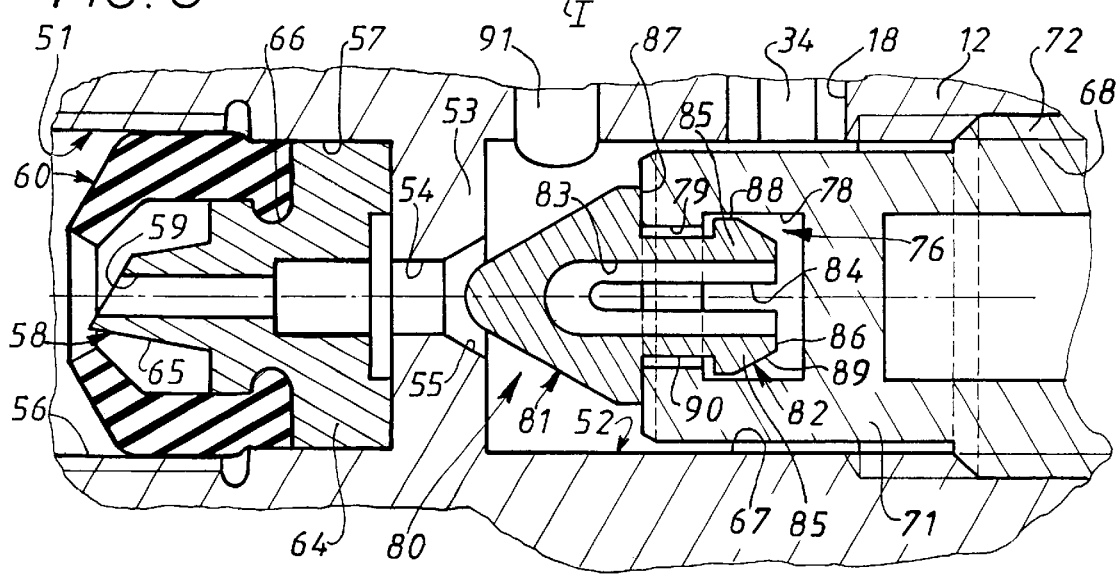

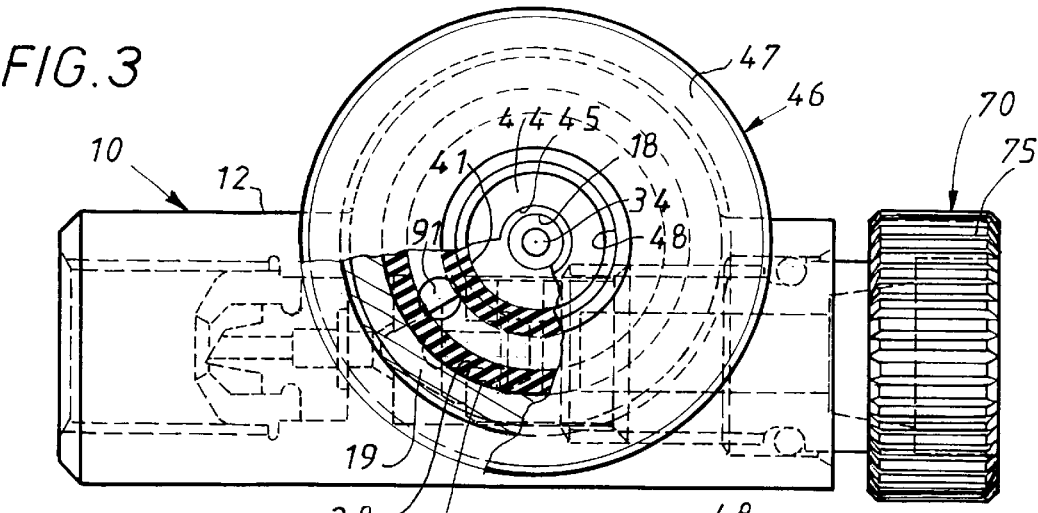
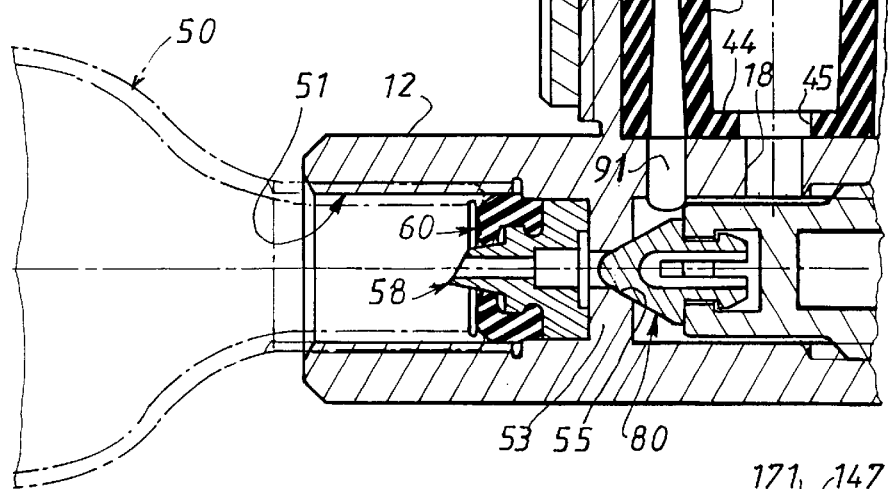
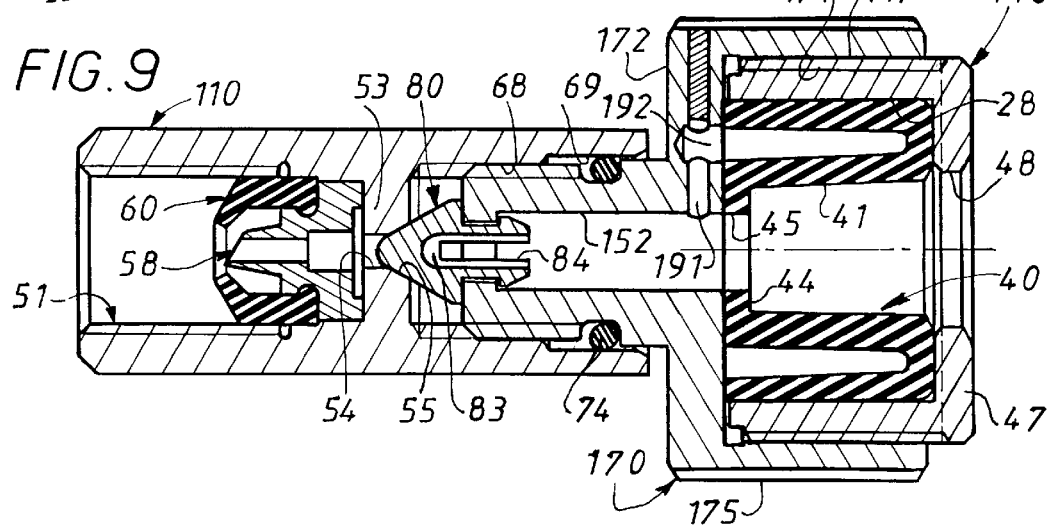

5,947,172

INFLATOR DEVICE USING A COMPRESSED GAS CYLINDER OR CARTRIDGE

BACKGROUND OF THE INVENTION

Field of the Invention

The present invention concerns an inflator device.

An inflator device of this kind can be used to inflate a tire or the like fitted with an inflator valve, for example.

An aim of the present invention is to propose an inflator device using a compressed gas cylinder or cartridge that is compact, light, easy to manufacture and therefore capable of industrialization at low cost.

The inflator device of the invention is easy to transport and, in the case of a device suitable for inflating a tire of a two-wheel vehicle, in particular one in which the rear wheel is driven by pedals, it can be put in a pocket.

SUMMARY OF THE INVENTION

The invention consists in an inflator device using a compressed gas cylinder or cartridge for inflating a tire or the like having an inflator valve, the device including an internally screwthreaded supply bore adapted to have the neck of the cylinder or the cartridge closed by a capsule screwed into it and at the bottom of which is provided a perforator surrounded by a supply seal, the supply bore communicating via an axial hole with a distribution bore, the communication being controlled by a selectively operated valve carried by a distributor moveable axially, the device further including a cavity adapted to receive in sealed fashion the inflator valve of the tire or the like and communicating with the distribution bore, in which device the seal is assured by a valve seal which has two coaxial circular parts joined by a transverse annular part, the valve seal being placed in the cavity with the annular part facing outwards and held in the cavity by a cap provided with a passage for the valve of the tire or the like, a passage being provided for establishing communication between the distribution bore and the space between the two coaxial circular parts of the valve seal.

Advantageously, the two coaxial circular parts of the valve seal comprise an inside part and an outside part and the inside part has an annular rim directed inwards and defining a central passage through which the cavity and the distributor bore communicate.

Preferably, the supply seal comprises a cylindrical skirt extended at one end by an annular rim and at the other end by a frustoconical lip oriented towards the axis of the cylindrical skirt; the section of the frustoconical lip decreases slightly from the cylindrical skirt towards its end near the axis.

Advantageously, the perforator has a base on top of which is a hollow needle and a groove at the periphery of the perforator is adapted to receive the annular rim of the supply seal; the hollow needle is entirely inside the supply seal, which surrounds it.

Advantageously, the valve has a generally conical head adapted to cooperate in sealed fashion with a frustoconical bearing surface around an axial hole through a separator partition separating the supply bore and the distribution bore.

Preferably, the head of the valve is carried by a tailpiece in which there is provided an axial blind hole and a diametral slot so that two elastic lugs are formed each having a semi-cylindrical groove for clipping the valve to the end of the distributor; the valve clips to the end of the distributor with axial and radial clearance.

In one embodiment the device includes a body supporting the supply seal and the distributor and the distributor which carries the valve also carries the valve seal and the supply seal and the valve and the valve seal are aligned along the axis of the body.

In another embodiment the device includes a body in two parts having a first part supporting the valve seal along a first axis and a second part supporting the supply seal along a second axis and the distributor and the first and second axes are at an angle to each other.

Preferably, the axes are orthogonal.

Advantageously, the axes are not coplanar and the first part of the body carries a plunger extending along its axis for selectively establishing communication between the distribution bore and the outside and/or a pressure gauge.

Preferably, the perforator slides in the body.

For a better understanding of the invention, embodiments shown in the appended drawings will now be described by way of purely illustrative and non-limiting example.

BRIEF DESCRIPTION OF THE DRAWINGS

FIG. 1 is a view of the inflator device of the invention in section taken along the line I—I in FIG. 2.

FIG. 2 is a view in section taken along the line II—II in FIG. 1.

FIG. 3 is a view in the direction of the arrow III in FIG. 2.

FIG. 4 is a view analogous to FIG. 1 showing the plunger of the device in a different position.

FIGS. 5 and 6 are sectional views showing the supply and valve seals, respectively.

FIG. 7 is a fragmentary view analogous to FIG. 2 in which the device is equipped with a compressed gas cylinder.

FIG. 8 is a fragmentary view to a larger scale of the area VIII in FIG. 2.

FIG. 9 is a sectional view showing a variant of the inflator device of the invention.

DETAILED DESCRIPTION OF THE PREFERRED EMBODIMENTS

The inflator device shown in FIGS. 1 through 8 has a body 10 comprising a first part 11 with a first axis 13 and a second part 12 with a second axis 14.

The first part 11 has an internal cylindrical bore 15 along the axis 13 (FIG. 1); at one end the bore 15 opens to the outside and at the other end it is delimited by a transverse partition 16.

The inside wall of the end of the bore 15 open to the outside carries an inside thread 17 which cooperates in a sealed fashion with an outside screwthread on a screwthreaded end 27 of a plug 20.

The plug 20 has a tailpiece 21 having a diameter similar to that of the screwthreaded end 27 and separated from the latter by a flange 22 of larger diameter.

A bore 23 passes axially through the tailpiece 21 and partially through the flange 22 and opens in the axial direction into another bore 24 the diameter of which is slightly greater than that of the bore 23 and which opens to the outside via a frustoconical part forming a seat 25.

The other board 24 communicates with the outside via a hole 26 passing radially through the flange 22.

A plunger 30 passes through the plug 20.

To be more precise, the plunger 30 includes a cylindrical rod 31 sliding in the bore 23 in the plug 20, an O-ring 32 providing a seal; the rod 31 passes with radial clearance through the other bore 24 in the plug 20 and is extended by a flange 33 having a greater diameter than the rod 31; beyond the flange 33 the plunger carries an axial needle 34.

At the root of the flange 33 the rod 31 has a half-toroidal groove 35 adapted to receive an O-ring 36 adapted to cooperate in a sealed fashion with the seal 25 around the other bore 24 in the plug 20; a coil spring 37 surrounds the needle 34 and bears at one end on the plunger 30 and at the other end on the transverse partition 16 of the body 10, which has an opening 18 through which the needle 34 passes with clearance; the spring 37 spring-loads the O-ring 36 towards the seat 25; the dimensions of the plunger 30 are such that in the position in which the O-ring 36 is pressed onto its seat 25 the needle 34 extends through the opening 18 and projects slightly therefrom in the axial direction and the rod 31 is outside the bore 23.

On the side of the partition 16 opposite the plunger 30 the body 10 has a cylindrical wall 19 defining a cavity 28 open towards the outside and the end wall of which is the transverse partition 16. Its cylindrical inside face, along the axis 13, has a greater diameter than the bore 15.

The cavity 28 is adapted to receive a valve seal 40 shown in isolation in FIG. 6.

The valve seal 40 has coaxial circular inner and outer parts 41 and 42 connected together at one end by a transverse annular part 43; at the end opposite that joined to the outer part 42 the inner part 41 has an annular rim 44 directed inwards and defining a central passage 45.

The outside diameter of the outside part 42 of the valve seal 40 corresponds to the inside diameter of the cavity 28 intended to receive it; when the valve seal 40 is placed in the cavity 28 its annular rim is pressed against the transverse partition 16, the opening 45 in it surrounding the opening 18 in the transverse partition 16.

The valve seal 40 is held in place in the cavity 28 by a cap 46 screwed onto the outside face of the cylindrical wall 19, which bears on the transverse annular wall 43 of the valve seal 40 through its end wall 47, which end wall 47 is provided with a passage 48 for the valve of the tire to be inflated, as described hereinafter.

The second part 12 of the body 10, along the axis 14, comprises a supply bore 51 and a distribution bore 52 separated by a separator partition 53 in which there is an axial cylindrical hole 54 opening into the distribution bore 52 via a frustoconical bearing surface 55 (FIG. 2).

The bore 51 has a first part 56 open to the outside and internally screwthreaded followed by a second part 57 bordered axially by the separator partition 53 and having a diameter less than that of the first part 56.

The second part 57 is adapted to receive a centered perforator 58 through which there is an axial passage 59.

The perforator 58 is associated with a supply seal 60.

The supply seal 60 is shown in isolation in FIG. 5; it has a cylindrical skirt 61 extended at one end by an annular rim 62 and at the other end by a frustoconical lip 63 directed towards the axis of the cylindrical skirt 61; the section of the frustoconical lip 63 decreases slightly from the cylindrical skirt 61 to its end near the axis.

The perforator 58 includes a base 64 on top of which is a hollow needle 65 (FIG. 8); a groove 66 on the periphery of the perforator 58 is adapted to receive the annular rim 62 of the supply seal 60 for the purpose of mounting the latter on the perforator 58; when the perforator 58 equipped with the supply seal 60 is mounted in the second part 12 of the body 10 the base 64 is in the second 57 of the supply bore 51, pressed against the separator partition 53, and the supply seal 60 extends in the axial direction partly into the first and second parts 56 and 57 of said bore 51, the hollow needle 65 being entirely inside the supply seal 60 around it.

The distribution bore 52, which extends beyond the separator partition 53 relative to the supply bore 51, has three stages with diameters increasing from the separator partition 53 towards the outside.

The first stage 67 and the third stage 69 are smooth internally. The second stage 68 between them is screwthreaded internally.

The distribution bore 52 is adapted to receive a distributor 70 that has a front cylindrical area 71, an externally screwthreaded area 72 and a rear cylindrical area 73; the front and rear cylindrical areas 71 and 73 are adapted to slide inside the first and third stages 67 and 69 of the distribution bore 52; the externally screwthreaded area 72 is adapted to cooperate with the internally screwthreaded second stage 68 of said distribution bore 52. The rear cylindrical area 73 has a groove receiving an O-ring 74 providing a seal between the body 10 and the distributor 70 which also has, extending said rear cylindrical area 73, a holding button 75 for screwing and unscrewing the distributor 70 relative to the body 10.

At the end opposite the holding button 75 the distributor 70 has a valve 80.

To be more precise, in line with the front cylindrical area 71 the distributor 70 has a recess 76 opening to the outside and the section of which in a plane passing through the axis of the distributor 70 is generally T-shaped so that two adjacent half-recesses are defined, namely an inside half-recess 78 and an outside half-recess 79, the outside half-recess 79, which is open towards the outside, having a smaller diameter than the cylindrical part of the inside half-recess 78 which, in the embodiment shown, is formed by laterally recessing the front cylindrical area 71 of the distributor 70.

The valve 80 has a generally conical head 81 adapted to cooperate in sealed manner with the frustoconical bearing surface 55 around the axial hole 54 in the separator partition 53 of the second part 12 of the body 10 (FIG. 8).

The head 81 is carried by a generally cylindrical tailpiece 82 the diameter of which is less than the greatest diameter of the head 81; an axial blind hole 83 in the tailpiece 82 extends partly into the head 81; a diametral slot 84 is provided in the tailpiece 82 and partly in the head 81: the width and length of the slot 84 are respectively slightly less than the diameter and the length of the blind hole 83. By virtue of this feature, the tailpiece 82 comprises two elastic lugs 85 symmetrical relative to the median plane passing through the axis of the blind hole 83 and parallel to the flanks of the slot 84.

Each semi-cylindrical lug 85 is defined between a plane transverse end face 86 and the face 87 of the base of the head 81; the semi-cylindrical outside face 88 of each lug 85 merges with the plane end face 86 through a semi-frustoconical face 89; between the outside face 88 and the face 87 each lug 85 has a semi-cylindrical groove 90 the diameter of which at the bottom of the groove is slightly less than the diameter of the outside half-recess 79 of the distributor 70, which diameter is in turn slightly less than the diameter of the semi-cylindrical outside face 88 of the lug 85; the axial length of said groove 90 is slightly greater than the axial length of said outside half-recess 79.

The tailpiece 82 of the valve 80 is inserted into the recess 76 of the distributor 70: its insertion is facilitated by the semi-frustoconical faces 89 of the lugs 85; this clips the valve 80 onto the end of the distributor 70; note that because of the relative dimensions referred to above the valve 80 is mounted with both axial and radial clearance relative to the distributor 70.

As can be seen in FIGS. 1, 2 and 7, there is a passage 91 in the end wall of the cavity 28 of the body 10; the passage 91, the role of which will become apparent hereinafter, establishes communication between the distribution bore 52 and the cavity 28; the passage 91 opens into said cavity 28, which receives the valve seal 40, in the space between the inside and outside parts 41 and 42 of said valve seal 40.

The inflator device that has just been described operates in the following manner.

Initially the user assures that the axial hole 54 is closed by the valve 80 by turning the holding button 75 of the distributor 70, if necessary; because the valve 80 is mounted with both axial and radial clearance relative to the distributor 70, it is certain that the head 81 of the valve 80 will fit exactly to the frustoconical bearing surface 55 without it being necessary to manufacture the components concerned with great precision, in particular with regard to their concentricity.

Next the user fits the device with a cylinder of compressed gas, for example carbon dioxide.

The screwthreaded neck of the cylinder 50, part of which is shown in chain-dotted outline in FIG. 7, is screwed into the supply bore 51. The capsule closing it comes into contact with the hollow needle 65 of the perforator 58 which begins to perforate the capsule as the cylinder is screwed further in; the axial passage 59 is then in communication, upstream of the valve 80, with the pressurized interior of the cylinder 50 and is therefore also pressurized. Because it is mounted to slide in sealed fashion in the second part 57 of the supply bore 51, the perforator 58 behaves like a piston and is propelled towards the capsule of the cylinder and perforates it completely. In parallel with this said capsule compresses the frustoconical lip 63 and the cylindrical skirt 61 of the supply seal 60 which expand radially to provide a perfect seal between the second part 12 of the body 10, the perforator 58 and the cylinder 50, given the particular shape of the supply seal 60, as shown in FIG. 7.

The assistance to percussion provided by the perforator 58 itself is self-evident; for simplicity the perforator is shown in the figures in contact with the separator wall 53 but it can be at a slight distance from the latter, depending on circumstances and in particular given what has been stated above.

The inflator device is operational at this time.

Next the user fits the device over the valve of the tire to be inflated, inserting the latter through the passage 48 in the cap 46 of the device until it abuts against the annular rim 44 of the valve seal 40; in this position of the valve its actuator rod is on the axis of the needle 34 of the plunger 30 and at a slight distance from the latter.

The dimensions of the inside part 41 of the valve seal 40 relative to the outside diameter of the valve of the tire are such that the inflator device is attached to the valve of the tire to some degree by elastic clamping.

Next the user unscrews the distributor 70 slightly, so moving the valve 80 away from its seat 55. The compressed gas infiltrates into the first stage 67 of the distribution bore 52, passes through the radial clearance between this first stage 67 and the front cylindrical area 71 of the distributor 70 and through the opening 18 in the transverse partition 16, and then opens the valve of the tire, which it pressurizes.

In parallel with this, because of the passage 91, the pressurized gas pressurizes the space between the inside and outside parts 41 and 42 of the valve seal 40, so pressing the inside part 41 against the body of the valve of the tire and the outside part 42 against the cylindrical wall 19 of the second part 12 of the body 10; this assures a perfect seal between the valve of the tire and the body 10.

Of course, the pressure of the gas introduced into the tire can be chosen by operating on the distributor 70, this action varying the head loss across the space between the valve 80 and the frustoconical bearing surface 55; this pressure can be known, if required; all that is required for this, after closing the axial hole 54 by screwing in the distributor 70 is to connect a pressure gauge via the hole 26 in the first part 11 of the body 10 and to push the plunger 30 against the spring 37: the O-ring 36 is lifted off its seat 25 and the needle 34 opens the valve of the tire, establishing communication between the interior of the latter and the pressure gauge.

Of course, it will readily be understood that a pressure gauge reading can equally well be obtained during the inflation operation itself.

If a pressure gauge is not connected to the inflator device it is also possible to depressurize the tire by operating on the plunger 30, for example if the tire is judged to be over-inflated; this action establishes communication between the interior of the tire and the exterior via the nozzle 26.

The compact size of the inflator device just described and its ease of use, which additionally requires no significant effort by the user, are apparent. By virtue of its features, its component parts can be molded from plastics material or cast in light alloy; its small overall size and low weight make it easily transportable, for example in a pocket.

If the features enabling the use of a pressure gauge and/or depressurization of the tire are not required the inflator device can simplified and its size and weight further reduced.

FIG. 9 shows a simplified variant. In this figure parts identical to those of the previous variant, or having the same role, are identified by the same reference numbers.

In this variant the essential features of the device in accordance with the invention are retained, in particular the seals 60 and 40, the valve 80, and how they are fitted.

Here the body 110 of the device is in a single part, globally similar to the second part 12 of the body 10 in the previous variant. The distributor 170 has a hollow holding button 175 having an end wall 172 and an internally screwthreaded inside bore 171 receiving a cap 146 the outside cylindrical face 147 of which is screwthreaded and cooperates for screwing in and out with the inside bore 171 in the distributor 170; the cap 146 receives the valve seal 40 inside it in the same manner as the cap 46 in the previous variant. Here the distributor 170 carries the distributor bore 152 downstream of the valve 80 and opening through the end wall 172 in line with the central passage 45 of the valve seal 40.

The distribution bore 152 communicates with the space between the inside and outside parts of the valve seal 40, here via a radial bore 191 opening into a blind hole 192 extending parallel to the axis of the device in the end wall 172 of the button 175 of the distributor 170.

This variant operates in exactly the same way as the previous variant. Note that here, after the distributor 170 is slightly unscrewed, the pressurized gas contained in the cylinder screwed on at 51 travels to the distributor bore 152 across the diametrical slot 84 in the cap 80.

There is claimed:

1. An inflator device using a compressed gas cylinder or cartridge for inflating a tire or the like having an inflator valve, said device including an internally screwthreaded supply bore adapted to have the neck of said cylinder or said cartridge closed by a capsule screwed into it and at the bottom of which is provided a perforator surrounded by a supply seal, said supply bore communicating via an axial hole with a distribution bore, said communication being controlled by a selectively operated valve carried by a distributor moveable axially, said device further including a cavity adapted to receive in sealed fashion said inflator valve of said tire or the like and communicating with said distribution bore, in which device said seal is assured by a valve seal which has two coaxial circular parts joined by a transverse annular part, said valve seal being placed in said cavity with said annular part facing outwards and held in said cavity by a cap provided with a passage for said valve of said tire or the like, a passage being provided for establishing communication between said distribution bore and the space between said two coaxial circular parts of said valve seal.

2. The inflator device claimed in claim 1 wherein said two coaxial circular parts of said valve seal comprise an inside part and an outside part and said inside part has an annular rim directed inwards and defining a central passage through which said cavity and said distributor bore communicate.

3. The inflator device claimed in claim 1 wherein said supply seal comprises a cylindrical skirt extended at one end by an annular rim and at the other end by a frustoconical lip oriented towards the axis of said cylindrical skirt.

4. The inflator device claimed in claim 1 wherein said perforator has a base on top of which is a hollow needle and a groove at the periphery of said perforator is adapted to receive said annular rim of said supply seal.

5. The inflator device claimed in claim 4 wherein said hollow needle is entirely inside said supply seal, which surrounds it.

6. The inflator device claimed in any claim 1 wherein said valve has a generally conical head adapted to cooperate in sealed fashion with a frustoconical bearing surface around an axial hole through a separator partition separating said supply bore and said distribution bore.

7. An inflator device as claimed in claim 1 including a body supporting said supply seal and said distributor and wherein said first and second axes are said distributor which carries said valve also carries said valve seal and said supply seal and said valve and said valve seal are aligned along the axis of said body.

8. An inflator device as claimed in any claim 1 including a body in two parts having a first part supporting said valve seal along a first axis and a second part supporting said supply seal along a second axis and said distributor and wherein said first and second axes are at an angle to each other.

9. The inflator device claimed in claim 8 wherein said axes are orthogonal.

10. The inflator device claimed in claim 8 wherein said axes are not coplanar and said first part of said body carries a plunger extending along its axis for selectively establishing communication between said distribution bore and the outside and/or a pressure gauge.

11. The inflator device claimed in any claim 8 wherein said perforator slides in said body.

12. A inflator device using a compressed gas cylinder or cartridge for inflating a tire or the like having an inflator valve, including an internally screwthreaded supply bore adapted to have screwed into it the neck of said cylinder or said cartridge closed by the capsule and at the bottom of which is provide a perforator surrounded by a supply seal, said supply bore communicating via and axial hole with a distribution bore, said communication being controlled by a selectively operated valve carried by a distributor moveable axially, said device further including a cavity adapted to receive in sealed fashion said inflator valve of said tire or the like and communicating with said distribution bore, in which device said seal is assured by a valve seal and said supply seal comprises a cylindrical skirt extended at one end by an annular rim and at the other end by a frustoconical lip oriented towards the axis of said cylindrical skirt.

13. The inflator device claimed in claim 12 wherein the section of said frustoconical lip decreases slightly from said cylindrical skirt towards its end near said axis.

14. An inflator device as claimed in claim 12, including a body supporting said supply seal and said distributor and wherein said first and second axes are said distributor which carries said valve also carries said valve seal and said supply seal and said valve and said valve seal are aligned along the axis of said body.

15. An inflator device as claimed in claim 12, including a body in two parts having a first part supporting said valve seal along a first axis and a second part supporting said supply seal along a second axis and said distributor and wherein said first and second axes are at an angle to each other.

16. A inflator device using a compressed gas cylinder or cartridge for inflating a tire or the like having an inflator valve, including an internally screwthreaded supply bore adapted to have screwed into it the neck of said cylinder or said cartridge closed by the capsule and at the bottom of which is provide a perforator surrounded by a supply seal, said supply bore communicating via and axial hole with a distribution bore, said communication being controlled by a selectively operated valve carried by a distributor moveable axially, said device further including a cavity adapted to receive in sealed fashion said inflator valve of said tire or the like and communicating with said distribution bore, in which device said seal is assured by a valve seal and said valve has a generally conical head adapted to cooperate in sealed fashion with a frustoconical bearing surface around an axial hole through a separator partition separating said supply bore and said distribution bore.

17. The inflator device claimed in claim 16 wherein said head of said valve is carried by a tailpiece in which there is provided an axial blind hole and a diametral slot so that two elastic lugs are formed each having a semi-cylindrical groove for clipping said valve to the end of said distributor.

18. The inflator device claimed in claim 17 wherein said valve is clipped to the end of said distributor with axial and radial clearance.

19. An inflator device as claimed in claim 16, including a body supporting said supply seal and said distributor and wherein said first and second axes are said distributor which carries said valve also carries said valve seal and said supply seal and said valve and said valve seal are aligned along the axis of said body.

20. An inflator device as claimed in claim 16, including a body in two parts having a first part supporting said valve seal along a first axis and a second part supporting said supply seal along a second axis and said distributor and wherein said first and second axes are at an angle to each other.

21. An inflator device for inflating a tire or the like having an inflator valve, said device including a supply bore adapted to receive a compressed gas source and at the bottom of which is provided a supply seal, said supply bore communicating via an axial hole with a distribution bore, said communication being controlled by a selectively operated valve carried by a distributor moveable axially, said device further including a cavity adapted to receive in sealed fashion said inflator valve of said tire or the like and communicating with said distribution bore, in which device said seal is assured by a valve seal which has two coaxial circular parts joined by a transverse annular part, said valve seal being placed in said cavity with said annular part facing outwards and held in said cavity by a cap provided with a passage for said valve of said tire or the like, a passage being provided for establishing communication between said distribution bore and the space between said two coaxial circular parts of said valve seal.

22. An inflator device for inflating a tire or the like having an inflator valve, including a supply bore adapted to receive a compressed gas source and at the bottom of which is provided a supply seal, said supply bore communicating via and axial hole with a distribution bore, said communication being controlled by a selectively operated valve carried by a distributor moveable axially, said device further including a cavity adapted to receive in sealed fashion said inflator valve of said tire or the like and communicating with said distribution bore, in which device said seal is assured by a valve seal and said supply seal comprises a cylindrical skirt extended at one end by an annular rim and at the other end by a frustoconical lip oriented towards the axis of said cylindrical skirt.

23. An inflator device for inflating a tire or the like having an inflator valve, including a supply bore adapted to receive a compressed gas source and at the bottom of which is provided a supply seal, said supply bore communicating via and axial hole with a distribution bore, said communication being controlled by a selectively operated valve carried by a distributor moveable axially, said device further including a cavity adapted to receive in sealed fashion said inflator valve of said tire or the like and communicating with said distribution bore, in which device said seal is assured by a valve seal and said valve has a generally conical head adapted to cooperate in sealed fashion with a frustoconical bearing surface around an axial hole through a separator partition separating said supply bore and said distribution bore.

* * * * *